(12) United States Patent
Hausler et al.

(10) Patent No.: US 9,308,836 B2
(45) Date of Patent: Apr. 12, 2016

(54) FOLDING AND RECLINING SEAT FOR VEHICLE

(75) Inventors: Henry Hausler, Manchester, MI (US); Gary Langner, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/586,873

(22) Filed: Oct. 26, 2006

(65) Prior Publication Data

US 2008/0100112 A1  May 1, 2008

(51) Int. Cl.
*B60N 2/02* (2006.01)
*B60N 2/22* (2006.01)
*B60N 2/30* (2006.01)

(52) U.S. Cl.
CPC .............. *B60N 2/2209* (2013.01); *B60N 2/305* (2013.01); *B60N 2/3031* (2013.01)

(58) Field of Classification Search
CPC .. B60N 2/3065; B60N 2/3045; B60N 2/3047; B60N 2/305
USPC .................. 297/331, 14, 334, 317, 342, 343; 296/65.09, 65.01, 65.13, 65.16
See application file for complete search history.

(56) References Cited

U.S. PATENT DOCUMENTS

| | | | | |
|---|---|---|---|---|
| 1,756,807 A * | 4/1930 | Black et al. | | 297/329 |
| 2,346,414 A | 11/1940 | Carpenter | | |
| 2,725,921 A * | 12/1955 | Markin | | 297/216.15 |
| 4,452,486 A * | 6/1984 | Zapf et al. | | 297/343 |
| 5,112,109 A | 5/1992 | Takada et al. | | |
| 5,498,052 A * | 3/1996 | Severini et al. | | 296/65.09 |
| 5,533,305 A * | 7/1996 | Bielecki | | 52/79.1 |
| 6,695,378 B2 | 2/2004 | Hanagan | | |
| 6,883,854 B2 | 4/2005 | Daniel | | |
| 6,959,960 B2 | 11/2005 | Buccinna et al. | | |
| 7,270,371 B2 * | 9/2007 | Adragna | | B60N 2/2209 296/65.09 |
| 7,517,008 B2 * | 4/2009 | Ebel | | 297/14 |
| 7,559,594 B2 * | 7/2009 | McMillen | | 296/65.09 |
| 7,611,200 B2 * | 11/2009 | Jovicevic | | B60N 2/2209 297/14 |
| 7,654,602 B2 * | 2/2010 | Smiley et al. | | 296/65.16 |
| 2004/0183328 A1* | 9/2004 | Daniel | | 296/65.03 |
| 2004/0232750 A1* | 11/2004 | Rohee et al. | | 297/334 |
| 2007/0096497 A1* | 5/2007 | Adragna et al. | | 296/65.16 |

* cited by examiner

*Primary Examiner* — Philip Gabler
(74) *Attorney, Agent, or Firm* — LeClairRyan

(57) ABSTRACT

A folding and reclining seat that can be folded against the back wall of the interior of an extended cab or super cab pick up vehicle is disclosed. The seat may be folded flush into the back wall thereby maximizing usable interior cargo space when not in use. The angle of the back seat can be adjusted by selective fore-and-aft movement of the seat cushion.

15 Claims, 5 Drawing Sheets

FOLDING AND RECLINING SEAT FOR VEHICLE

TECHNICAL FIELD

The present invention relates generally to foldable and reclining vehicle seats. More specifically, the present invention relates to a folding and reclining vehicle seat which has an adjustable back angle.

BACKGROUND OF THE INVENTION

In the light and medium duty truck industry there is a desire to increase interior vehicle storage space, particularly in extended- or super-cab vehicles. This increase in interior storage space is desired particularly when unused seats compromise space availability.

It is known in vehicles to provide a foldable seat to increase cargo space, particularly in pick-up vehicles. Such seats find particular use as second row seats in extended- or super-cab vehicles. Foldable seats generally fold either into the vehicle floor or against the back wall of the cab. These seats are typically available in bucket seat or bench seat configurations. Regardless of type, the seat back in known foldable seats is conventionally latched to the back wall using a simple latch and striker arrangement to retain the seat back in an upright position. No adjustment of either the seat back or the seat cushion is thus permitted.

Current foldable seat designs offer some value in providing for temporary increased interior space while not in use. However, as in so many areas of vehicle technology, there is room in the art of vehicle foldable seat design for providing an alternative configuration which will offer the user greater comfort in the seat itself without compromising the foldable features of the seat.

SUMMARY OF THE INVENTION

The present invention provides a folding and reclining vehicle seat that can be folded against the back wall of the interior of an extended-cab or super-cab pick-up vehicle. The seat may be folded flush into the back wall thereby maximizing usable interior cargo space when not in use. According to the present invention, the folding and reclining seat comprises a seat cushion assembly operatively associated with a seat back assembly such that the angle of the seat back assembly can be adjusted by the fore-and-aft movement of the seat cushion assembly.

The seat cushion assembly comprises a seat cushion, an inner seat cushion frame, and a lower seat cushion frame. The inner seat cushion frame is slidably attached to the lower seat cushion frame. The slidable relationship between the inner seat cushion frame and the lower seat cushion frame is regulated by a locking mechanism. The back angle is adjustable by an operator grasping a traditional seat "towel bar" release lever and sliding the seat fore-and-aft to achieve the back angle desired.

The seat back assembly comprises a back cushion and a back cushion frame that is movably attached to the cab back wall. In lieu of a hard fixed attachment of the seat back assembly to the cab back panel, the seat back assembly is attached to the cab back panel at two points via a sliding pivot. Such an attachment arrangement will provide the requisite freedom of movement to allow the seat back assembly to move up and down in response to the fore-and-aft movement of the seat cushion. This attachment is accomplished using a detentless seat rack mounted to the back cushion frame operatively associated with a track mounted to a pivot. The pivot is fixed to the cab back. This arrangement allows for sufficient up-and-down movement of the seat back assembly in response to the various seat back angles both for seated and stowed positions. As an alternative to the detentless track, a link bar could be used to facilitate movement of the seat back assembly. Regardless of the method selected, the up-and-down movement of the cushion while holding the seat back in position fore-and-aft for seated and stowed positions would be enabled.

The stowed position would be achieved by a separate release lever that would allow the entire seat cushion assembly to be lifted.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
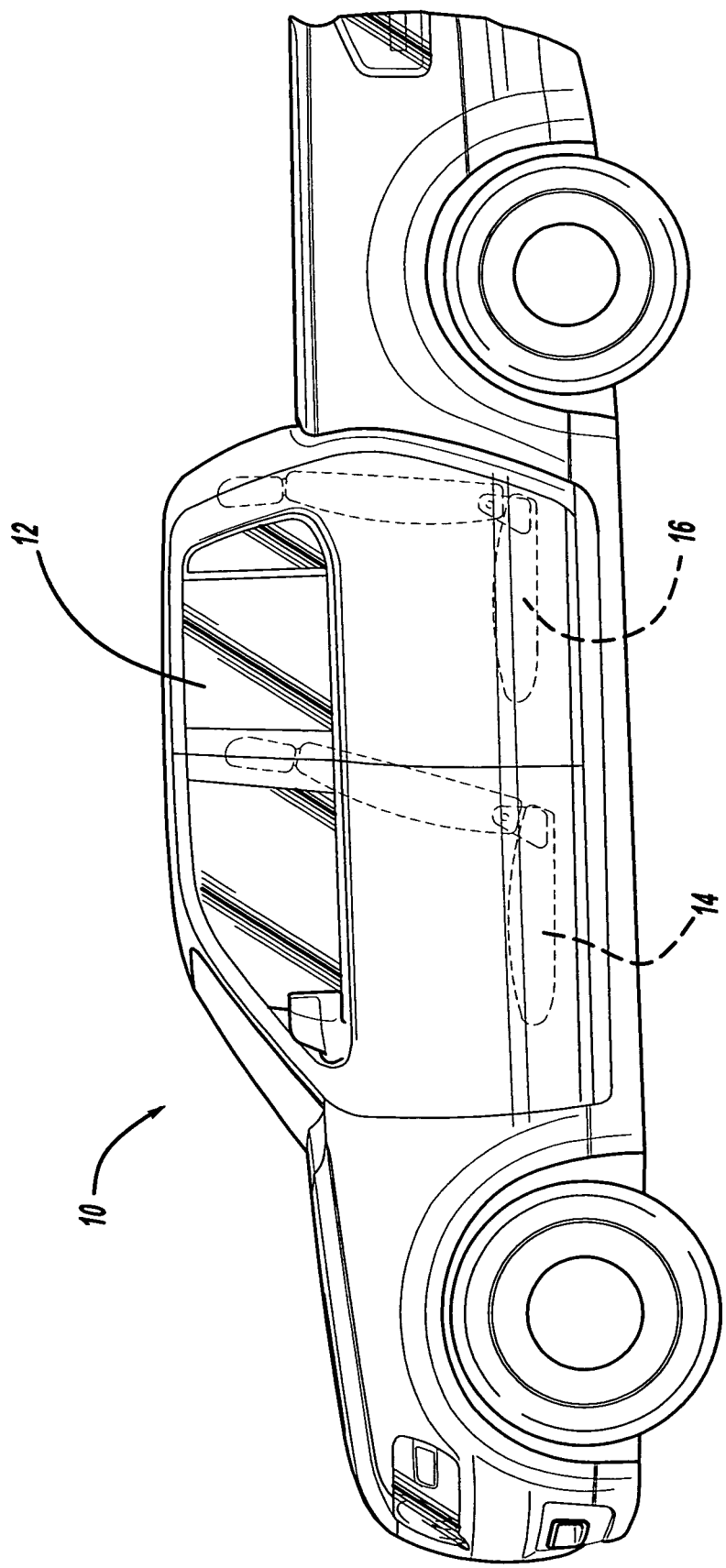
FIG. 1 shows a left side elevational view of a deployed stowable seat disposed in a pick-up vehicle in accordance with the present invention.

In the following figures, the same reference numerals will be used to refer to the same components. In the following description, various operating parameters and components are described for one constructed embodiment. These specific parameters and components are included as examples and are not meant to be limiting.

With reference to FIG. 1, a pick-up vehicle, generally illustrated as 10, includes a vehicle cabin 12. A front seat 14 is provided in the forward part of the vehicle cabin 12 and a rear folding and reclining seat 16 is provided in the rearward part of the vehicle cabin 12.

Figure 2:
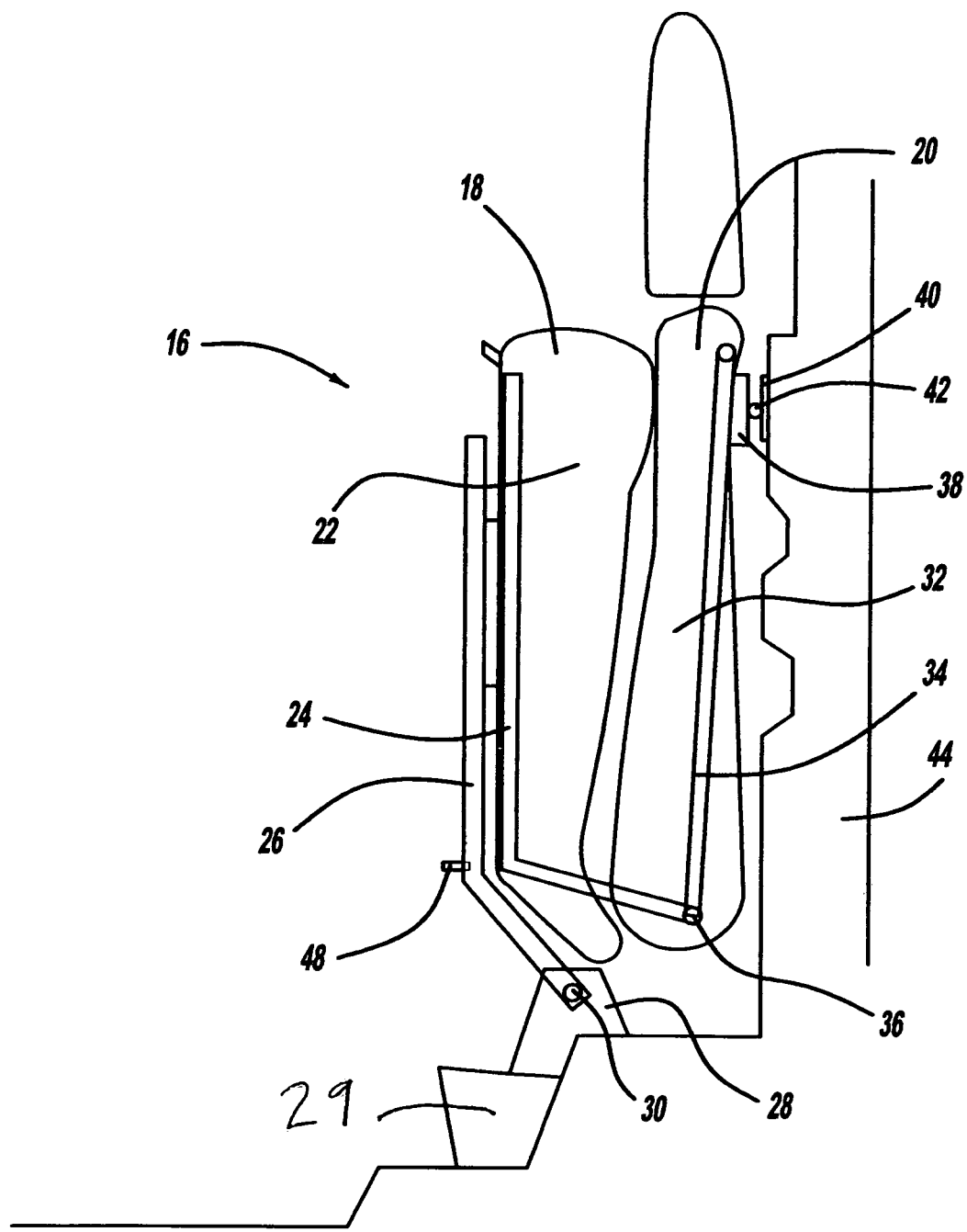
FIG. 2 is a side view of an embodiment of a vehicle seat in its stowed position in accordance with the present invention.
Figure 3:
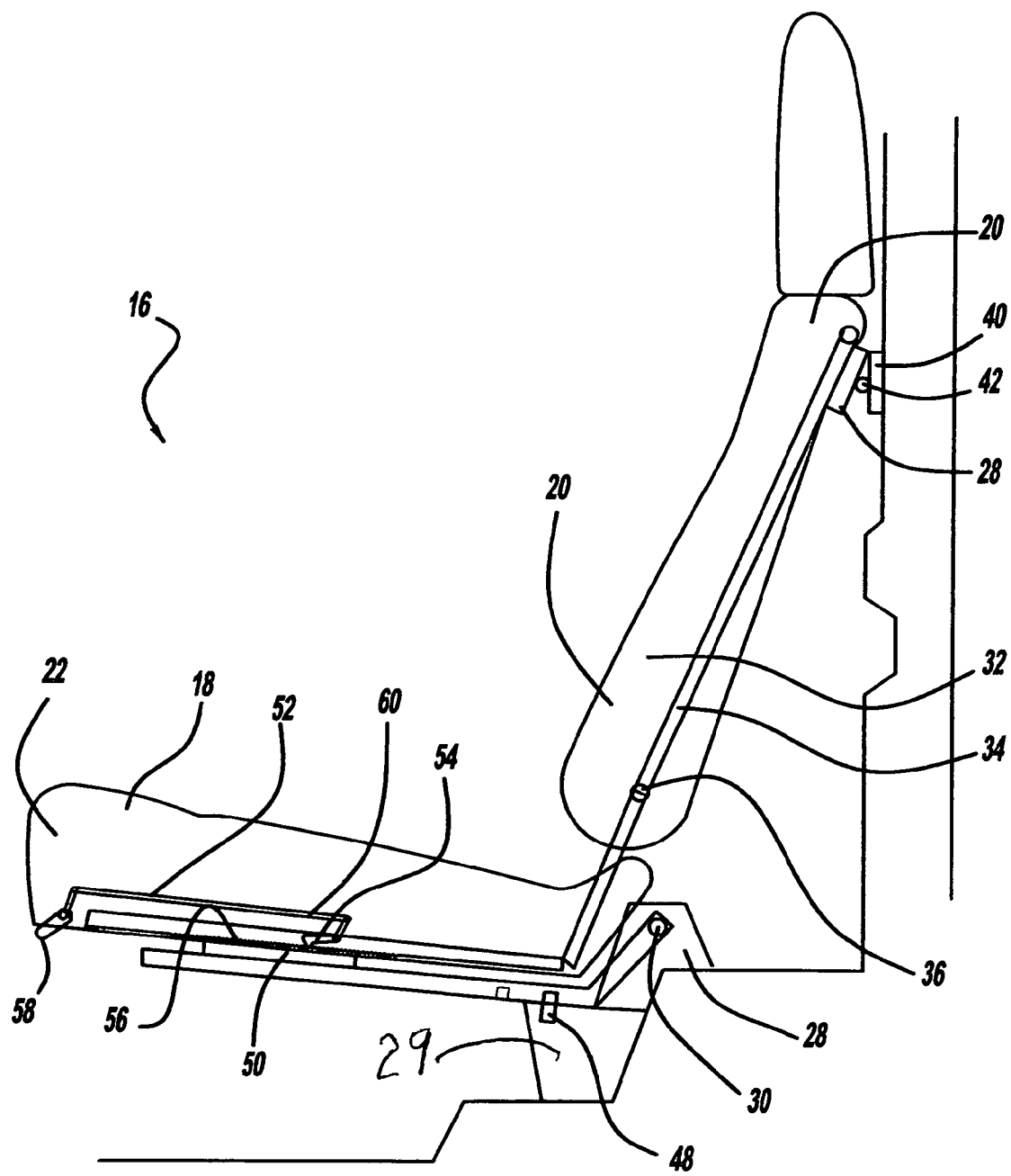
FIG. 3 is a side view of the vehicle seat of FIG. 2 in its unstowed position and slid to its aft position.
Figure 4:
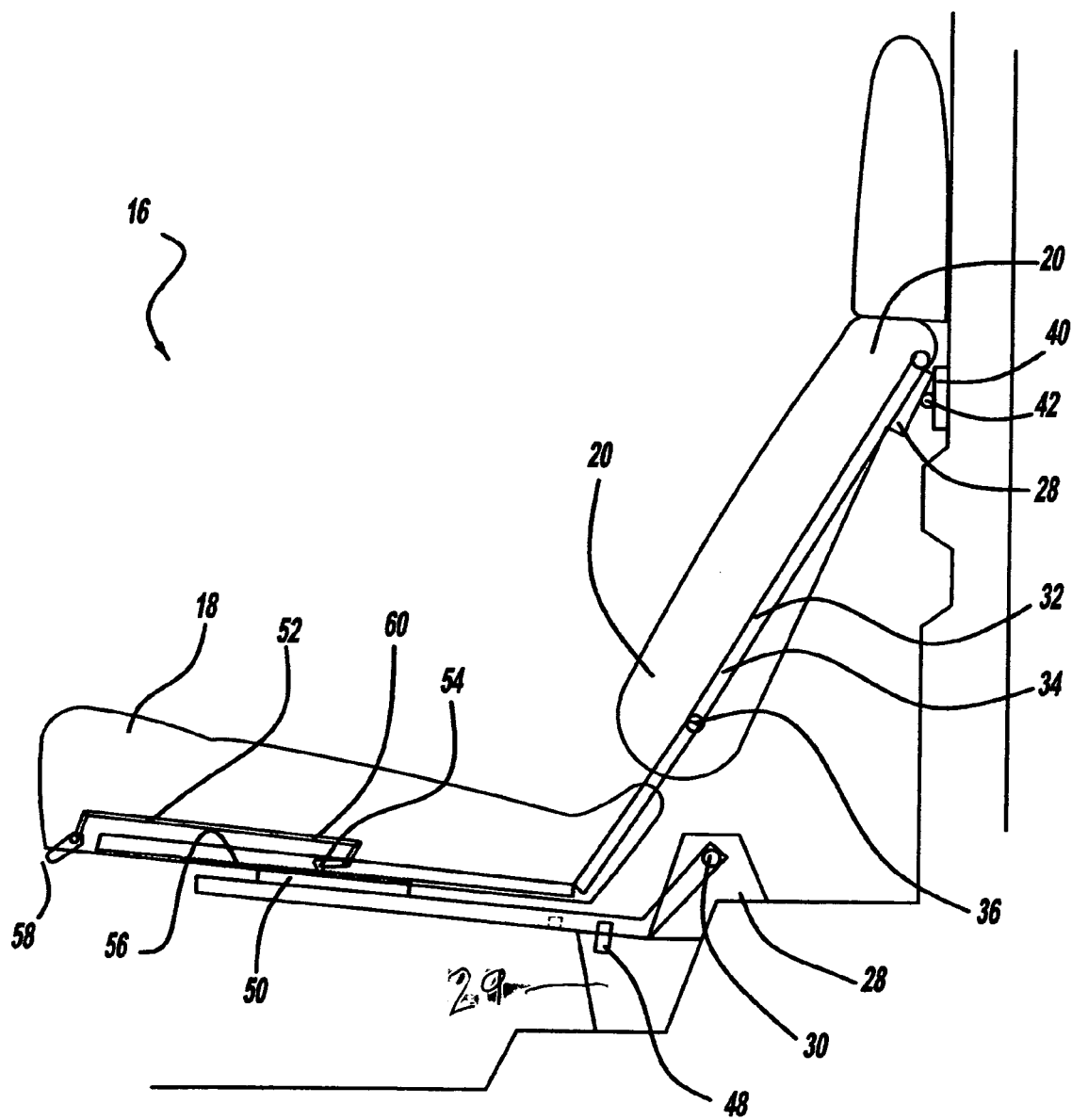
FIG. 4 is the same view as FIG. 3 but illustrating the seat in its fore position.

Referring to FIGS. 2 through 4, side views of the rear folding and reclining seat 16 are illustrated. FIG. 2 illustrates the seat 16 in its stowed position, FIG. 3 illustrates the seat 16 in its unstowed and aft position, and FIG. 4 illustrates the seat 16 in its unstowed and fore position.

With specific reference to FIG. 2, the seat 16 includes a seat cushion assembly 18 and a seat back assembly 20. The seat cushion assembly 18 include a seat cushion 22, an inner seat cushion frame 25, and a lower seat cushion frame 26. The seat cushion 22 is of the conventional type. The lower seat cushion frame 26 is pivotably attached to a pivot bracket 28 which allows pivotal movement at pivot point 30.

The seat back assembly 20 includes a back cushion 32 and a back cushion frame 34. The back cushion frame 34 is pivotably associated with the lower seat cushion frame 26 at pivot point 36. As shown in FIG. 2, a detentless, slidable bracket 38 is slidably attached to the upper portion of the back cushion frame 34. The slidable bracket 38 is itself pivotably attached to a pivoting wall bracket 40 at pivot point 42. The pivoting wall bracket 40 is fixedly attached to back wall 44 of the vehicle 10.

Figure 2A:
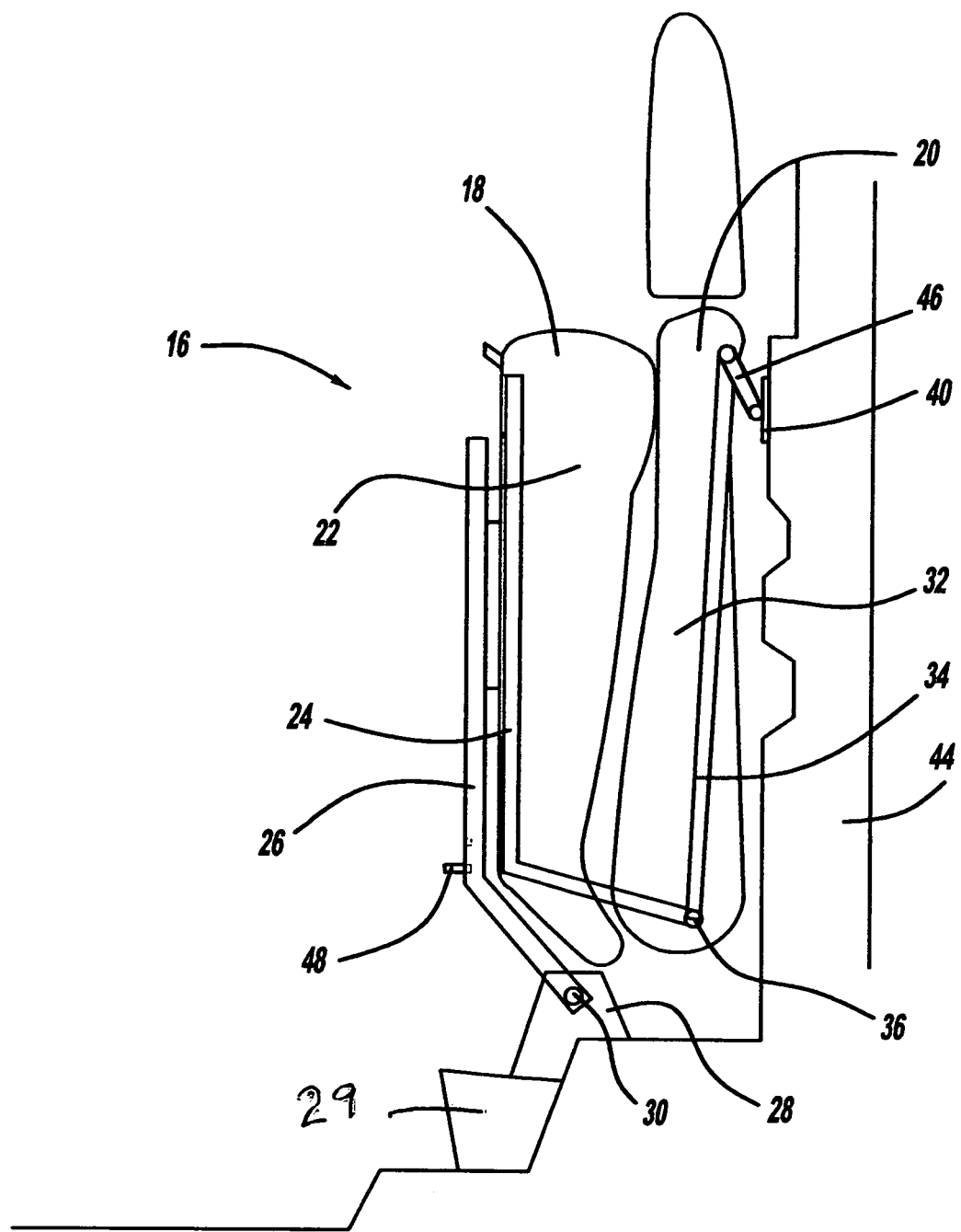
FIG. 2A shows a detailed view of an alternate method of attaching the seat back to the back wall of the vehicle.

As an alternative method for attaching the back cushion frame 34 to the back wall 44 of the vehicle 12, FIG. 2A illustrates the use of a link bar 46 which is pivotably attached to both the back cushion frame 34 and to the pivoting wall bracket 40.

Both the slidable bracket 38 of FIG. 2 and the link bar 46 of FIG. 2A accomplish the need to allow freedom of up-and-down movement of the seat back assembly 20 in response to the fore-and-aft movement of the seat cushion assembly 18.

FIGS. 3 and 4 illustrate the seat 16 in its unstowed position. The seat 16 is locked in its unstowed position by a lever-type latch 48. To release the seat 16 from its unstowed position as illustrated in FIGS. 3 and 4, the operator moves the latch 48 to its unlocked position as is conventionally known.

The inner seat cushion frame 24 is allowed to move fore-and-aft with respect to the lower seat cushion frame 26 by way of a sliding track 50 mounted to the lower seat cushion frame 26. The inner seat cushion frame 24 is slidably movable upon the sliding track 50. To halt the sliding movement of the inner seat cushion frame 24 with respect to the lower seat cushion frame 26, a locking assembly 52 is provided. The locking assembly 52 includes a locking pawl 54 which engages a detented surface 56 of the sliding track 50, a release lever 58 (preferably in the form of a "towel bar" release lever), and an interconnecting rod 60. By pulling up on the release lever 58, the seat cushion 22 and the inner seat cushion frame 24 may be selectively moved fore-and-aft.

In operation, the seat 16 is moved to its unstowed position by pushing down on the seat cushion 22 until the latch 48 is engaged. The occupant may then select the angle of the back cushion 32 by operating the release lever 58 until the desired angle of the back cushion 32 is achieved. The seat 16 may be re-stowed with the seat cushion 22 in any of the selected locked fore-and-aft positions.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A stowable vehicle seat system for use in a vehicle cabin, the seat system comprising:
a substantially vertical vehicle back wall and a substantially horizontal vehicle floor;
a movable seat back assembly having an upper portion operatively associated with said substantially vertical vehicle seat back wall, said seat back assembly including a back cushion frame including an elongated frame member that extends from near the upper portion towards a lower portion;
a seat cushion assembly hingedly coupled to the seat back assembly, such that the seat cushion assembly is movable between a substantially vertical position and a substantially horizontal position, said seat cushion assembly including a lower seat cushion frame and an inner seat cushion frame slidably coupled to the lower seat cushion frame, such that the seat cushion assembly is reversibly movable from a forward position to a rearward position when the inner seat cushion frame slides on the lower seat cushion frame, wherein the lower seat cushion frame is pivotably attached directly to the back cushion frame near the lower portion; and
a pivot bracket connected to said substantially horizontal vehicle floor, said lower seat cushion frame being pivotably attached to said pivoting bracket,
wherein the inner seat cushion frame includes another elongated member that includes a first portion generally co-planar with a seat cushion and a second portion that extends at an angle from the first portion and that pivotably attaches directly to the back cushion frame.

2. The stowable vehicle seat system of claim 1 wherein said seat back assembly is pivotably attached to said substantially vertical vehicle seat back wall.

3. The stowable vehicle seat system of claim 2 wherein said seat back assembly includes a slide bar and a pivoting wall bracket attached to said substantially vertical vehicle back wall, said slide bar and said pivoting wall bracket being operatively related.

4. The stowable vehicle seat system of claim 2 wherein said seat back assembly includes a link bar and a pivoting wall bracket attached to said substantially vertical vehicle back wall, said link bar and said pivoting wall bracket being operatively related.

5. The stowable vehicle seat system of claim 1 including a locking mechanism to lock said inner seat cushion frame to said lower seat cushion frame.

6. The stowable vehicle seat system of claim 1 wherein said back cushion frame is movably attached to said substantially vertical vehicle back wall.

7. A stowable vehicle seat system for use in a vehicle cabin, the seat system comprising:
a substantially vertical vehicle back wall and a substantially horizontal vehicle floor;
a moveable seat back having an upper portion and a lower portion and pivotably and slidably coupled to the substantially vertical vehicle back wall near the upper portion, the moveable seat back including a back cushion frame near the lower portion;
a seat cushion assembly having a lower frame member and an inner frame member that are slidably coupled to one another to allow for selective and reversible movement of said seat cushion assembly from a forward position to a rearward position, wherein the inner frame member is pivotably coupled directly to the back cushion frame near the lower portion, and
a pivot bracket pivotably connecting said lower seat cushion frame to said substantially horizontal floor, wherein the system includes a first pivotable attachment that pivotably attaches the inner frame member to the back cushion frame and a second pivotable attachment that pivotably attaches the lower cushion frame to the pivot bracket.

8. The stowable vehicle seat system of claim 7 wherein said seat back assembly is pivotably attached to said substantially vertical vehicle seat back wall.

9. The stowable vehicle seat system of claim 8 wherein said seat back assembly includes a slide bar and a pivoting wall bracket attached to said substantially vertical vehicle back wall, said slide bar and said pivoting wall bracket being operatively related.

10. The stowable vehicle seat system of claim 8 wherein said seat back assembly includes a link bar and a pivoting wall bracket attached to said substantially vertical vehicle back wall, said link bar and said pivoting wall bracket being operatively related.

11. The stowable vehicle seat system of claim 7 including a locking mechanism to lock said inner seat cushion frame to said lower seat cushion frame.

12. The stowable vehicle seat system of claim 7 wherein said back cushion frame is movably attached to said substantially vertical vehicle back wall.

13. A stowable vehicle seat system for use in a vehicle cabin, the seat system comprising:
- a substantially vertical vehicle back wall and a substantially horizontal vehicle floor;
- a movable seat back assembly having a back cushion frame;
- a seat cushion assembly movable between a substantially vertical position and a substantially horizontal position, said assembly having a lower seat cushion frame and an inner seat cushion frame directly pivotably connected to said back cushion frame, said inner seat cushion frame and said lower seat cushion frame being slidably connected to allow for selective and reversible movement of said seat cushion assembly from a forward position to a rearward position, said seat assembly further comprising a locking mechanism to lock said inner seat cushion frame to said lower seat cushion frame; and
- a pivot bracket pivotably connecting said lower seat cushion frame to said substantially horizontal vehicle floor, wherein the system includes a first pivotable attachment that pivotably attaches the inner frame member to the back cushion frame and a second pivotable attachment that pivotably attaches the lower seat cushion frame to the pivot bracket.

14. The stowable vehicle seat system of claim 13 wherein said seat back assembly is pivotably attached to said substantially vertical vehicle back wall.

15. The stowable vehicle seat system of claim 13 wherein said back cushion frame is movably attached to said substantially vertical vehicle back wall.

\* \* \* \* \*